United States Patent [19]

Bright

[11] 3,778,682

[45] Dec. 11, 1973

[54] SHIELDING APPARATUS FOR ELECTRICAL EQUIPMENT

[76] Inventor: William L. Bright, 0605 S.W. Curry St., Portland, Oreg. 97201

[22] Filed: Dec. 6, 1971

[21] Appl. No.: 204,857

[52] U.S. Cl. ............. 317/119, 174/5 R, 174/138 F, 317/118

[51] Int. Cl. ............................................. H02b 1/14

[58] Field of Search ......................... 174/5 R, 138 F; 200/168 H; 317/103, 112, 120, 118, 119

[56] References Cited

UNITED STATES PATENTS

| | | | |
|---|---|---|---|
| 2,014,586 | 9/1935 | Rah | 174/5 R |
| 2,795,766 | 6/1957 | Dyer et al. | 174/5 R X |
| 3,079,457 | 2/1963 | Newcomb, Jr. | 174/5 R |
| 3,310,712 | 3/1967 | Paddock | 317/120 |
| 3,560,632 | 2/1971 | Wallace | 174/138 F |

*Primary Examiner*—Laramie E. Askin
*Attorney*—Eugene M. Eckelman

[57] ABSTRACT

Shielding apparatus for use by workmen to cover live electrical contacts so that work can be safely carried on in adjacent areas. A base bracket includes a flange for support on upright barrier walls associated with the electrical equipment and also includes clamp fingers for securely attaching such bracket to the barriers in supported relation thereon. The base bracket in turn supports a first shielding box or cover by overlapping hook means. Such box includes a front wall, side walls, and a bottom wall for shielding live contacts from all directions from which work may be performed in adjacent areas by workmen. Tie-down means are associated with the shielding box for anchoring it securely in place. One or more second shielding boxes are provided having greater length than the first shielding box to shield additional live contacts in adjacent areas. The second shielding boxes also includes tie-down means for anchoring them in a supported position. The base bracket and shielding boxes are constructed of electrically insulating material and each is provided with eye means for handling them by an insulated stick.

10 Claims, 6 Drawing Figures

INVENTOR.
WILLIAM L. BRIGHT
BY Eugene M. Eckelman
ATTY

INVENTOR.
WILLIAM L. BRIGHT
BY Eugene M. Eckelman
ATTY.

SHIELDING APPARATUS FOR ELECTRICAL EQUIPMENT

BACKGROUND OF THE INVENTION

This invention relates to shielding apparatus for electrical equipment of a type arranged to cover a portion of electrical equipment so that workmen can work on closely adjacent equipment.

Electrical equipment in pad mounted feed-through mountings and the like employ banks of contacts in a panel-board generally arranged in cooperating pairs between which fuse or switch elements or the like can be connected. Such type of electrical equipment is being more commonly used all the time as underground wiring is being favored. These banks of electrical contacts are associated with high voltage and cannot safely be worked on by workmen without cutting off the electrical supply. It is thus required that the input circuit to the contacts be opened which of course means that customer service must be temporarily interrupted.

SUMMARY OF THE INVENTION

According to the present invention and forming an important objective thereof, shielding apparatus is provided which is arranged to temporarily cover certain contacts in an assembly whereby other contacts can be safely worked on without the necessity of opening the circuit to any part of the system.

More particular objects are to provide shielding apparatus of the type described which employs as a first element a base bracket having means arranged to be supported on insulating barrier means in the electrical apparatus and having clamp means for securely connecting said bracket to such barrier means, which employs as a second element one or more shielding boxes of insulated material capable of being supported on the base bracket and having wall means shielding live contact means; and which employs as a third element additional shielding boxes also of insulated material arranged to be used in association with the first shielding box for shielding adjoining sets of contacts.

Another object of the present invention is to provide shielding apparatus of the type described which is light in weight and which includes means for convenient handling by an insulated stick.

The invention will be better understood and additional objects and advantages will become apparent from the following description taken in connection with the accompanying drawings.

DETAILED DESCRIPTION OF A PREFERRED EMBODIMENT

Figures 1, 3:
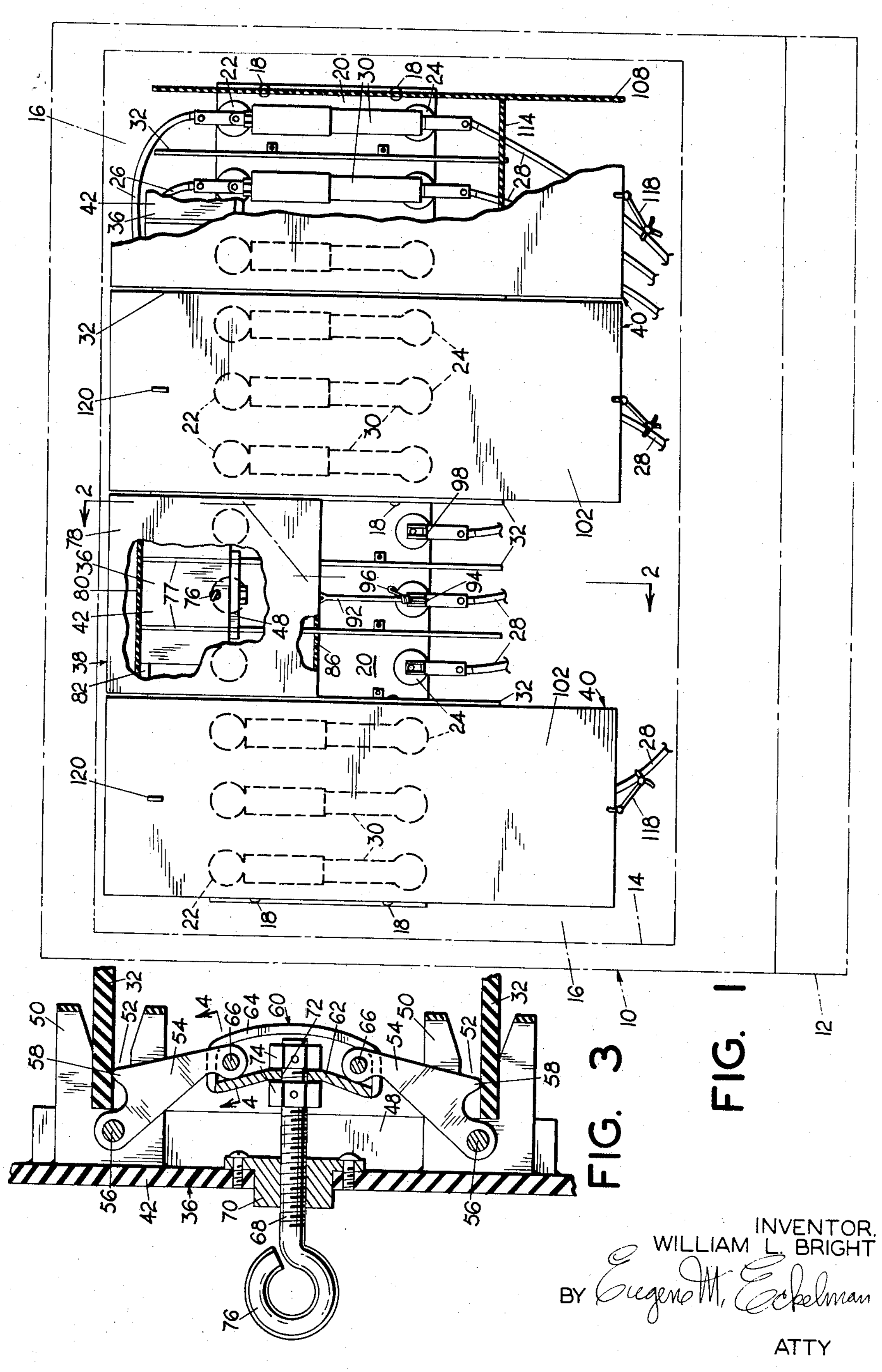
FIG. 1 is a front elevational view of a pad mounted enclosure which houses electrical equipment with which the present shielding apparatus is utilized, the shielding apparatus of the present invention being shown mounted in position and partially broken away.
FIG. 3 is an enlarged horizontal sectional view taken on the line 3—3 of FIG. 2 showing in detail a base bracket forming a part of the present shielding apparatus

Referring in detail to the drawings and first to FIG. 1, the numeral 10 designates somewhat diagrammatically and in phantom lines an enclosure 10 of conventional application. Such enclosure is shown mounted on a pad 12. The numeral 14 designates an opening into the enclosure which may be covered by a door, not shown. Enclosure 10 has a rear wall 16, FIG. 2, to which is secured, as by bolts 18, a support plate 20 on which in turn are secured upper contact assemblies 22 and lower contact assemblies 24. As best seen in FIG. 1, the upper and lower contact assemblies are provided in vertically aligned pairs, and in the electrical set-up there are generally three associated pairs in a feed-through hook-up. In conventional systems, the upper contact assemblies have live connection to bus means 26 and the lower contact assemblies have connection to outlet lines 28. Respective upper and lower contact assemblies are electrically connected by fuses or switches 30.

Disposed vertically between each pair of contact assemblies is an insulating wall 32. These walls form barriers between the contacts and prevent arcing therebetween. The walls 32 terminate short of the top of the enclosure so that the bus means 26 can extend thereacross for connection to the upper contact assemblies 22.

When it is desired to work on one bank of contacts, it is desired that all the other contacts, or at least closely adjacent contacts, be shielded so that workmen cannot accidentally touch any live parts. The usual work to be done in the equipment is to provide hookups from the lower contact assemblies 24 of one unit such as when providing new outlets or changing circuitry, the top contact assemblies usually being already connected to the source and remaining hot. Thus, it is desired that the lower bank of contact assemblies on which work is to be performed be protected from their associated upper contacts as well as from both the upper and lower contact assemblies of the adjacent banks of units.

Figures 2, 4, 5, 6:
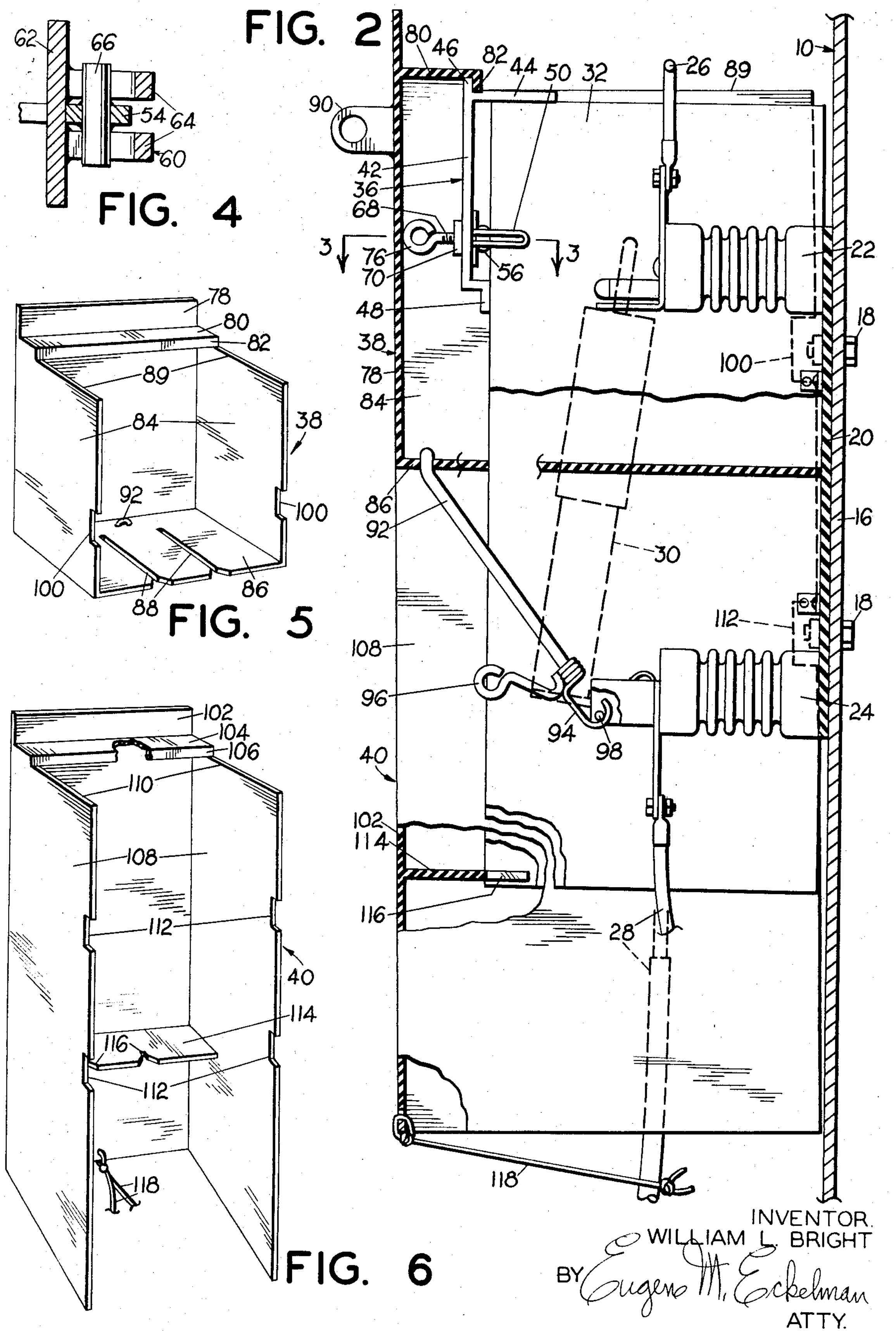
FIG. 2 is an enlarged cross sectional view taken on the offset line 2—2 of FIG. 1.
FIG. 4 is a sectional view taken on the line 4—4 of FIG. 3.
FIGS. 5 and 6 are perspective views of shielding boxes also forming a part of the invention.

The purpose of the present invention is to provide the protection as above stated and includes basically three parts, namely, a base bracket 36 shown in FIGS. 1, 2 and 3, a first shielding box or cover 38 shown in FIGS. 1, 2 and 5, and a second shielding box or cover 40 shown in FIGS. 1, 2 and 6. Base bracket 36 is removably attachable to the insulating walls 32 and provides support for the two shielding boxes 38 and 40, it being understood that a separate base bracket 36 is provided for each one of the boxes 38 and 40 being used. As an example and with reference to FIG. 1, one box 38 and three boxes 40 are used. Thus, four of such base brackets are required to provide support for the four shielding units.

Base bracket 36 comprises a body plate 42, FIGS. 1, 2 and 3, having a rearwardly extending integral right angular flange 44. This flange is located a short distance down from the top edge of the plate to form a top hooking projection 46 as a part of the plate 42. Flange 44 is adapted to seat on the top edges of insulating walls 32 for providing support for the base bracket. The lower end of body plate 42 has a rearwardly offset portion 48 which engages the front edges of insulating walls 32 in the mounted position of the base bracket to provide a stable abutment for the plate 42 against the forward edges of insulating walls 32.

It is necessary that the base bracket 36 have secured support on the insulating walls 32, and for this purpose it has a pair of integral, rearwardly extending guide members 50 which have vertical slots 52 opening rearwardly for receiving forward portions of insulating walls 32. Guide members 50 are U-shaped as viewed vertically and from the side and are open at their sides to receive laterally extending clamp fingers 54 having a vertical pivot connection 56 in the guide members 50. Clamp fingers 54 have rearwardly disposed lateral projections 58 which, upon rearward pivotal movement of the fingers 54, provide a clamping connection on walls 32 between the projections 58 and one side of the slots 52.

The inner ends of clamp fingers 54 have a laterally slidable, pivotal connection with an operating member 60, also seen in FIG. 4, which includes a vertically disposed body plate 62 integrally supporting a pair of horizontally disposed vertically spaced bars 64. The inner ends of the fingers 54 extend into the area between the two bars 64 and have the laterally slidable, pivotal connection to the operating member 60 by integral upright pins 66. A drive screw 68 has threaded engagement in a tapped insert 70 secured in the base bracket body plate 42 and thus has axial adjustment by rotatable movement thereof. The forward end of drive screw 68 passes freely through an aperture 72 in the body plate 62 of operating member 60 and has connection to the plate 62 by forward and rearward nuts 74 pinned non-rotatably to the drive screw. The other end of drive screw 68 has an eye 76 for detachable connection to a suitable tool for rotating such screw and also for manipulating the base bracket 36 onto and off the support position on the insulating walls 32. Such tools are in common use and comprise insulating sticks referred to as Hot Sticks or shotgun sticks.

For the purpose of mounting a base bracket 36 in place, it is placed on the top edge of insulating walls 32 with the guide members 50 receiving forward portions of such walls. The drive screw 68 is then suitably rotated to move the operating member 60 inwardly for pivoting clamp fingers 54 in a direction to cause firm engagement of lateral projections 58 against walls 32. The forward surface of plate 42 of the base bracket has vertical markings 77, FIG. 1, which are aligned forwardly with the openings or slots 52 in the guide members 50 so that a workman in installing the base bracket can align these markings with the front edges of the walls 32 to readily guide the bracket onto the walls.

Shielding box 38 has a front wall 78, FIGS. 1, 2 and 5, provided with a rearwardly extending horizontal flange 80 spaced down a short distance from the upper edge of the front wall and terminating at its rearward end in a downturned lip 82. Flange 80 is arranged to support the housing 38 on the base bracket 36 by means of a hooked engagement of lip 82 of the housing 38 behind projection 46 of the base bracket 36.

Housing 38 has a pair of side walls 84 and a bottom wall 86. Bottom wall 86 has a pair of rearwardly opening slots 88 which are selectively spaced laterally to receive insulating walls 32. These slots extend inwardly to a point substantially vertically aligned with lip 82 to provide a vertical mounting for the box 38 when the walls 32 are bottomed in the slots. The top edges of walls 84 are cut away at 89 from the lip portions 82 to the rearward ends of the walls so that such portions of the top edges are only slightly higher than the top edges of the walls 32 to prevent interference with the wiring 26 at the top of the enclosure by the walls of the box. Front wall 78 of the housing 38 includes an eye 90 for releasable attachment to an insulating stick.

Connected to the bottom wall 86 of the housing 38 is an anchor cord 92 terminating at its free end in a hook 94 having an eye 96 secured thereto for engagement by an insulating stick. Anchor cord 92 is preferably of stretchable material such as shock cord whereby upon support of the housing 38 on the base bracket 36 the said housing can be anchored down firmly by engaging hook 94 with any lower stationary point such as a pin 98 which forms a part of lower contact assembly 24.

The lateral dimension of housing 38 is predetermined such that as seen in FIG. 1 it will fit between two of the walls 32 which define the individual banks of equipment, and the vertical height thereof is such that the bottom wall is spaced below the upper contact assemblies 22 to protect the worker from such upper contact assemblies. The rearward edges of side walls 84 are notched at 100 to receive the bolts 18.

All of the shielding boxes 40 are of identical construction, FIGS. 1, 2 and 6, having a front wall 102 provided with a horizontal rearwardly extending flange 104 spaced a short distance down from the top edge of the front wall. Flange 104 has a downturned lip 106 adapted for engagement behind projection 46 of the base bracket 36 for support of the housing 40 in a manner similar to support of the housing 38. Housing 40 has a pair of side walls 108 and is open at the top and bottom, the top edges of side walls 108 being notched at 110 from the bottom edge of lip 106 rearwardly so that, similar to the housing 38, the top edges of the side walls are not much higher than the top edge of walls 32 to provide clearance for the wires 26. Side walls 108 have rear notches 112 to fit over bolts 18.

A horizontal abutment plate 144 extends rearwardly from the front wall 102 at a point between the top and bottom of the box and has end connection with side walls 108. Abutment plate 114 has a pair of rearwardly opening slots 116, and these slots are arranged to receive a forward edge portion of insulating walls 32 to form a stop engagement of the lower portion of housing 40 against the said walls 32. Slots 116 extend inwardly to a point substantially vertically aligned with lip 106 to provide a vertical mounting for the box 40 when the walls 32 are bottomed in the slots. Tie-down means 118 are secured to a lower portion of the front wall 102 and are arranged to be tied to a lower portion of the equipment such as to outlet lines 28 to secure the box 40 in against the walls 32. Housing 40, similar to housing 38, is of a selected width to fit between walls 32 of adjoining banks of switching units, and this housing also has an eye 120 for detachable connection to an insulating stick.

In the operation of the present invention, the desired number of base brackets 36 are secured in place depending upon the number of housings 38 and 40 to be utilized. In an enclosure set-up as illustrated in FIG. 1, for example, wherein four banks of switching units are provided, a base bracket 36 is secured on each bank of switching units. The switching unit which is to be worked upon will have a shielding box 38 secured thereon to allow workmen to work on the bottom contacts and be protected from the upper live contacts. The other banks of units will be covered throughout their full length by the longer housings 40. These latter housings provide adequate protection from the front and sides, the protection from the rear of course being provided by the support plate 20 of the enclosure. All of the components of the invention are handled by an insulating stick in a well known manner with the exception of tie-down 118. This tie-down can be safely tied to a lower portion of the enclosure or equipment once the housing 40 is in place. In the set-up of shielding boxes, workmen can work directly on the one set of exposed contacts 24, FIG. 1, without danger of touching live parts.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. Apparatus for shielding electrical equipment of a type having a plurality of adjacent pairs of contacts mounted on a supporting wall and having insulated walls disposed between said contacts for forming barriers therebetween, one of the contacts in each pair having live connection with an electrical circuit and also being arranged to be connected electrically to the other contact in the pair, such shielding apparatus comprising, a. a base bracket comprising a flange arranged to seat on an insulating barrier wall for support thereon,
b. clamp means on said base bracket arranged to grip at least one of the barrier walls for securely attaching said bracket to said walls,
c. a shielding cover,
d. and means detachably supporting said shielding cover on said base bracket,
e. said shielding cover having insulating wall means for shielding the live contacts from contacts to be worked on by workmen when said cover is supported on said base bracket.

2. The shielding apparatus of claim 1 wherein said clamp means includes a. a rearwardly extending member having a rearwardly opening slot for receiving a forward portion of a barrier wall,
b. a pivotal clamp finger arranged upon selected pivotal movement thereof to clamp said base bracket on a barrier wall,
c. and axially adjustable drive means connected with said clamp finger for pivoting the latter.

3. The shielding apparatus of claim 2 including means on said base bracket and said shielding cover for handling thereof by an insulated stick.

4. The shielding apparatus of claim 1 including resilient connecting means on said shielding cover arranged for removable connection to adjacent electrical equipment.

5. The shielding apparatus of claim 1 including a. resilient connecting means on said shielding cover arranged for removable connection to adjacent electrical equipment,
b. and means on said base bracket, shielding cover and resilient connecting means for handling thereof by an insulated stick.

6. A panel-board of electrical equipment comprising a. a supporting wall,
b. a plurality of adjacent pairs of contacts mounted on said supporting wall,
c. projecting insulated walls on said supporting wall disposed between said pairs of contacts for forming barriers therebetween,
d. one of the contacts in each pair having live connection with an electrical circuit and also being arranged to be connected electrically to the other contact in the pair,
e. a pair of base brackets comprising a flange arranged to seat on said projecting walls for support thereon, said brackets being supported in adjacent relation on respective ones of said projecting walls,
f. clamp means on said base brackets arranged to grip at least one of the projecting walls for securely attaching said brackets to said projecting walls,
g. a pair of shielding covers,
h. and means detachably supporting said shielding covers on respective base brackets,
i. one of said shielding covers having insulated wall means arranged to shield a live contact in a pair from the other contact which is to be worked on by workmen when said cover is supported on its base bracket,
j. the other of said shielding covers having insulated wall means arranged to shield both contacts in a pair of contacts from contacts associated with the first mentioned shielding cover.

7. The shielding apparatus of claim 6 wherein said second shielding cover includes tie-down means for anchoring an end opposite from its support on said barrier walls to adjacent electrical equipment.

8. The shielding apparatus of claim 6 wherein said means detachably supporting said shielding covers on their respective base brackets comprise interengaging hook means on said covers and said brackets, and tie-down means arranged to be connected between an end of said shielding covers opposite from said hook means and adjacent electrical equipment.

9. The shielding apparatus of claim 6 including a third shielding cover having insulating wall means for shielding both contacts in a pair of contacts adjacent to the contacts associated with said first shielding cover but on the opposite side from said second shielding cover.

10. A panel-board of electrical equipment comprising a. a supporting wall,
b. a plurality of adjacent pairs of contacts mounted on said supporting wall,
c. projecting insulated walls on said supporting wall disposed between said pairs of contacts for forming barriers therebetween,
d. one of the contacts in each pair having live connection with an electrical circuit and also being arranged to be connected electrically to the other contact in the pair,
e. a pair of shielding covers,
f. and means detachably supporting said shielding covers on respective projecting walls,
g. one of said shielding covers having insulated wall means arranged to shield a live contact in a pair from a contact to be worked on by workmen when said cover is supported on said projecting walls,
h. the other of said shielding covers having insulated wall means arranged to shield both contacts in a pair of contacts from contacts associated with the first mentioned shielding cover.

* * * * *

UNITED STATES PATENT OFFICE
CERTIFICATE OF CORRECTION

Patent No. 3,778,682 Dated December 11,1973

Inventor(s) William L. Bright

It is certified that error appears in the above-identified patent and that said Letters Patent are hereby corrected as shown below:

Column 5, line 53, change "claim 2" to --claim 1--.

Signed and sealed this 16th day of April 1974.

(SEAL)
Attest:

EDWARD M.FLETCHER,JR.
Attesting Officer

C. MARSHALL DANN
Commissioner of Patents